(12) United States Patent
Yanagisawa et al.

(10) Patent No.: US 12,270,116 B2
(45) Date of Patent: Apr. 8, 2025

(54) ELECTROLYSIS SYSTEM AND METHOD OF OPERATING THE SAME

(71) Applicant: HONDA MOTOR CO., LTD., Tokyo (JP)

(72) Inventors: Kazuki Yanagisawa, Wako (JP); Masahiro Mohri, Wako (JP); Misato Maki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 533 days.

(21) Appl. No.: 17/681,898

(22) Filed: Feb. 28, 2022

(65) Prior Publication Data

US 2022/0307147 A1  Sep. 29, 2022

(30) Foreign Application Priority Data

Mar. 29, 2021 (JP) ................. 2021-055223

(51) Int. Cl.
| | |
|---|---|
| C25B 9/67 | (2021.01) |
| C25B 1/02 | (2006.01) |
| C25B 1/23 | (2021.01) |
| C25B 9/77 | (2021.01) |
| C25B 15/021 | (2021.01) |

(52) U.S. Cl.
CPC ................. *C25B 9/67* (2021.01); *C25B 1/02* (2013.01); *C25B 1/23* (2021.01); *C25B 9/77* (2021.01); *C25B 15/021* (2021.01)

(58) Field of Classification Search
CPC .... C25B 9/67; C25B 1/02; C25B 1/23; C25B 9/77; C25B 15/021; C25B 1/042; C25B 9/70; C25B 15/02; Y02E 60/50
See application file for complete search history.

(56) References Cited

U.S. PATENT DOCUMENTS

| | | |
|---|---|---|
| 2004/0149570 A1 | 8/2004 | Hiraiwa et al. |
| 2019/0194042 A1 | 6/2019 | Mohri et al. |
| 2019/0376196 A1 | 12/2019 | Mohri et al. |

FOREIGN PATENT DOCUMENTS

| | | | |
|---|---|---|---|
| CN | 1517451 A | 8/2004 | |
| CN | 109957811 A | 7/2019 | |
| CN | 110762852 A | * 2/2020 | ............... C25B 1/04 |
| JP | S3-303089 A | 12/1988 | |

(Continued)

OTHER PUBLICATIONS

Office Action dated Nov. 1, 2022 issued over the corresponding Japanese Patent Application 2021-055223 with the English translation thereof.

(Continued)

*Primary Examiner* — Jacob M Amick
*Assistant Examiner* — Charles J Brauch
(74) *Attorney, Agent, or Firm* — Carrier, Shende & Associates P.C.; Joseph P. Carrier; Jeffrey T. Gedeon

(57) ABSTRACT

An inner case of an electrolysis system houses therein an electrolysis stack. An intermediate case encloses the inner case from outside. An outer case encloses the intermediate case from outside. A method of operating the electrolysis system includes a vacuum step, a heat storage step, and an electrolysis starting step. In the vacuum step, air in a vacuum space formed between the intermediate case and the outer case is discharged. In the heat storage step, a heating fluid is supplied to a heat storage space formed between the inner case and the intermediate case.

15 Claims, 4 Drawing Sheets

(56) References Cited

FOREIGN PATENT DOCUMENTS

| | | |
|---|---|---|
| JP | S63-303088 A | 12/1988 |
| JP | 2004-139960 A | 5/2004 |
| JP | 2005-048290 A | 2/2005 |
| JP | 3639861 B * | 4/2005 |
| JP | 3639861 B1 | 4/2005 |
| JP | 2019-210529 A | 12/2019 |

OTHER PUBLICATIONS

Office Action dated Jul. 24, 2024 issued in the corresponding Chinese Patent Application 202210186357.8 with the English machine translation thereof.

* cited by examiner

ELECTROLYSIS SYSTEM AND METHOD OF OPERATING THE SAME

CROSS-REFERENCE TO RELATED APPLICATIONS

This application is based upon and claims the benefit of priority from Japanese Patent Application No. 2021-055223 filed on Mar. 29, 2021, the contents of which are incorporated herein by reference.

BACKGROUND OF THE INVENTION

Field of the Invention

The present invention relates to an electrolysis system and a method of operating such an electrolysis system.

Description of the Related Art

A solid oxide electrolysis cell (SOEC) electrolyzes $CO_2$ gas and water vapor to generate synthesis gas (mixture gas of carbon monoxide gas and hydrogen gas). This SOEC is considered to be usable as one of the techniques for P2G (Power to Gas) and $CO_2$ reduction. A plurality of such SOECs are stacked together and used as an electrolysis stack. The electrolysis stack needs to be operated at a high temperature of 600° C. to 900° C. To this end, the electrolysis stack is housed in a case for thermal insulation.

As an example of a heat insulating structure of such a case for the stack, JP 2004-139960 A discloses a case for housing solid oxide fuel cells (SOFCs). The case has a vacuum insulation layer. Therefore, the heat of the SOFCs can be efficiently used for preheating the gas.

SUMMARY OF THE INVENTION

However, in the system of the SOFCs described in JP 2004-139960, since it is necessary to seal the vacuum heat insulating layer in the manufacturing stage, there is a problem that the degree of vacuum decreases while a minute gas leakage continues.

The present invention has the object of solving the aforementioned problems.

An aspect of the present invention is an electrolysis system including an electrolysis stack in which a plurality of solid oxide electrolysis cells are stacked one another, the electrolysis system including an inner case that houses the electrolysis stack, an intermediate case that encloses the inner case from outside, and an outer case that encloses the intermediate case from outside, wherein a heat storage space is formed between the inner case and the intermediate case, a vacuum space is formed between the intermediate case and the outer case, the intermediate case includes a fluid supply flow path for supplying a heating fluid to the heat storage space, and the outer case includes an air lead-out flow path for discharging air in the vacuum space to the outside.

According to another aspect of the present invention, there is provided a method of operating an electrolysis system including an electrolysis stack in which a plurality of solid oxide electrolysis cells are stacked one another, the electrolysis system including an inner case housing the electrolysis stack, an intermediate case enclosing the inner case from outside, and an outer case enclosing the intermediate case from outside, the method including: a vacuuming step of discharging air in a vacuum space formed between the intermediate case and the outer case; a heat storage step of supplying a heating fluid to a heat storage space formed between the inner case and the intermediate case; and an electrolysis starting step of starting electrolysis by the electrolysis stack after the vacuum step and the heat storage step.

According to the present invention, it is possible to control the degree of vacuum in the vacuum space by discharging the air in the vacuum space to the outside through the air lead-out flow path.

Further, it is possible to control the temperature of the heat storage space by supplying the heating fluid from the fluid supply flow path to the heat storage space. Thus, the temperature of the electrolysis stack can be easily controlled.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
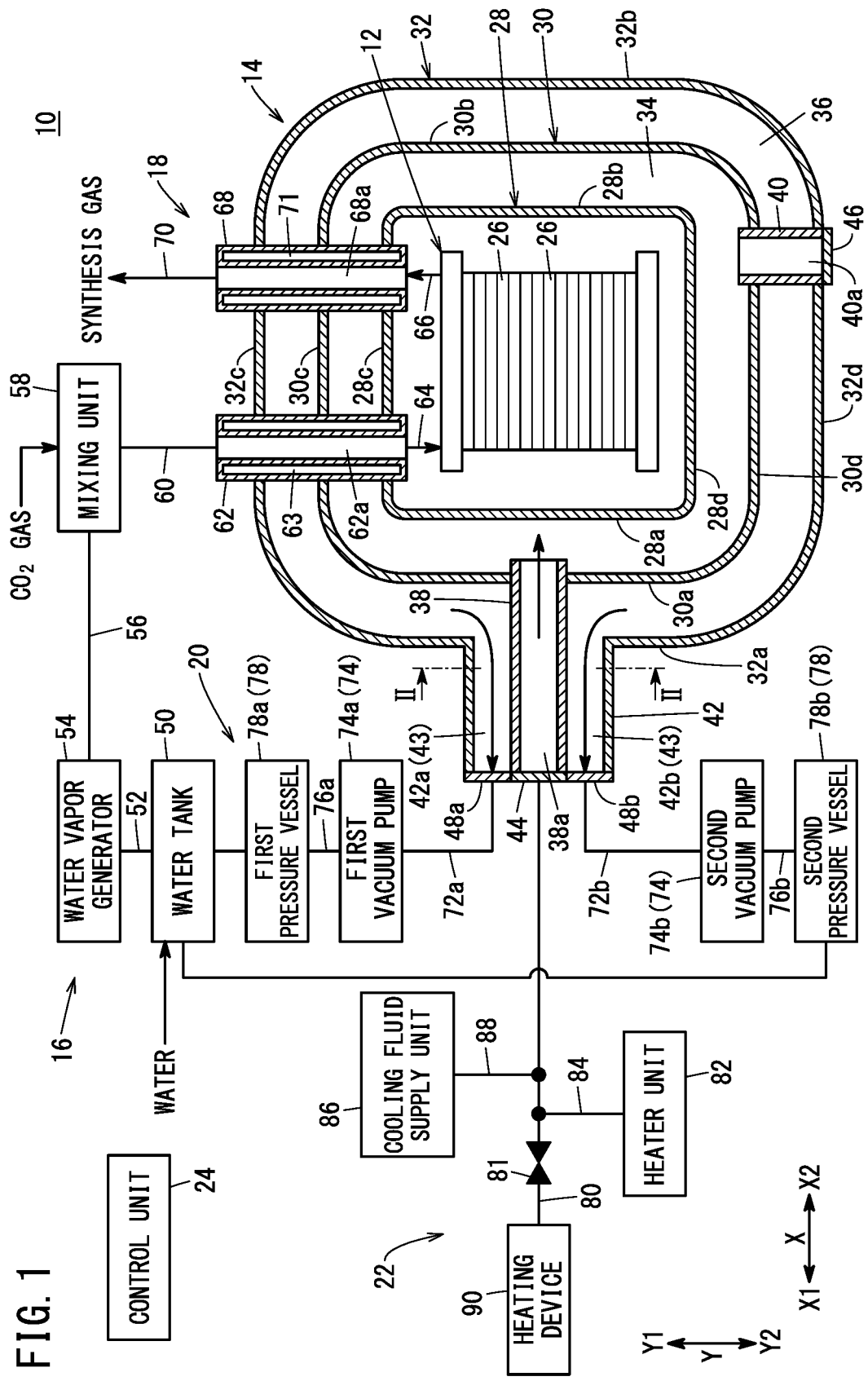
FIG. 1 is a schematic configuration diagram of an electrolysis system according to an embodiment of the present invention.

As shown in FIG. 1, an electrolysis system 10 according to an embodiment of the present invention includes an electrolysis stack 12, a case member 14, a reaction fluid supply unit 16, a synthesis gas led-out unit 18, a vacuum generation unit 20, a temperature control unit 22, and a control unit 24.

The electrolysis stack 12 has a plurality of electrolysis cells 26. The plurality of electrolysis cells 26 are stacked on each other. The electrolysis cell 26 is a solid oxide electrolysis cell (SOEC). The electrolysis cell 26 electrolyzes $CO_2$ gas (carbon dioxide gas) and water vapor to generate synthesis gas containing carbon monoxide gas and hydrogen gas. The electrolysis cell 26 operates at a relatively high temperature (for example, 600° C. or higher and 900° C. or lower). Although detailed illustration is omitted, the electrolytic cell 26 has an electrolyte (solid oxide electrolyte), a cathode, and an anode. The cathode is disposed on one side of the electrolyte. The anode is disposed on the other side of the electrolyte. An electrolysis power supply (not shown) is electrically connected to the electrolysis stack 12.

The case member 14 includes an inner case 28, an intermediate case 30, and an outer case 32. The inner case 28 houses the electrolysis stack 12. The intermediate case 30 encloses the inner case 28 from the outside. The outer case 32 encloses the intermediate case 30 from the outside. That is, the case member 14 has a triple-layered structure in which the electrolysis stack 12 is encased in three cases.

Figure 2:
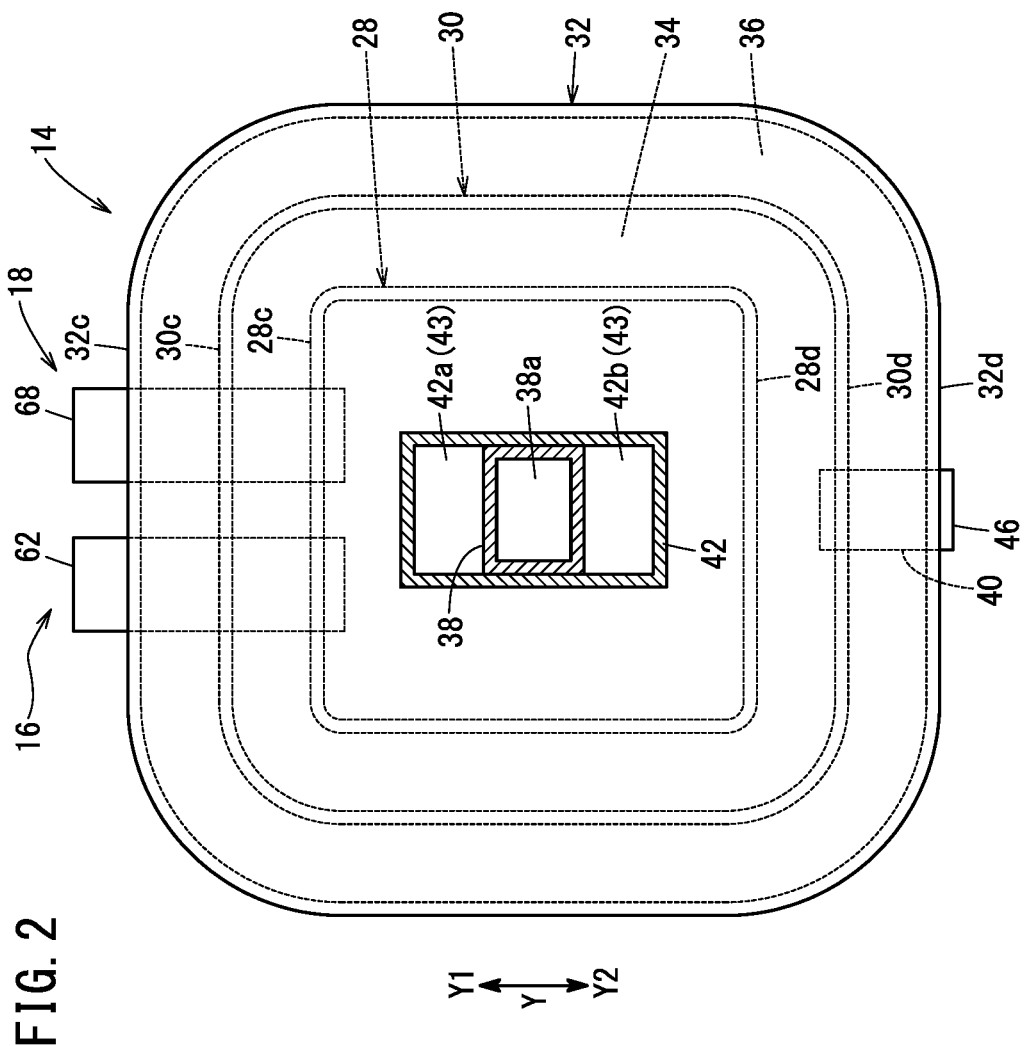
FIG. 2 is a cross-sectional view taken along line II-II of FIG. 1.

Each of the inner case 28, the intermediate case 30, and the outer case 32 is, for example, a rectangular box (hexahedron) (see FIGS. 1 and 2). A heat storage space 34 is formed between the inner case 28 and the intermediate case 30. The heat storage space 34 entirely covers the inner case 28 from the outside. A vacuum space 36 is formed between the intermediate case 30 and the outer case 32. The vacuum space 36 entirely covers the intermediate case 30 from the outside. The shapes and sizes of the inner case 28, the intermediate case 30, and the outer case 32 can be changed as appropriate.

The inner case 28 includes a first inner wall surface 28a in the arrow X1 direction, a second inner wall surface 28b in the arrow X2 direction, a third inner wall surface 28c in the arrow Y1 direction, and a fourth inner wall surface 28d in the arrow Y2 direction. The intermediate case 30 includes a first intermediate wall surface 30a in the direction of the arrow X1, a second intermediate wall surface 30b in the direction of the arrow X2, a third intermediate wall surface 30c in the direction of the arrow Y1, and a fourth intermediate wall surface 30d in the direction of the arrow Y2. The outer case 32 includes a first outer wall surface 32a in the direction of the arrow X1, a second outer wall surface 32b in the direction of the arrow X2, a third outer wall surface 32c in the direction of the arrow Y1, and a fourth outer wall surface 32d in the direction of the arrow Y2.

The case member 14 includes a fluid supply pipe 38, a fluid discharge pipe 40, and an air lead-out pipe 42. A heating fluid is supplied through the fluid supply pipe 38 to the heat storage space 34. The fluid is discharged through the fluid discharge pipe 40 from the heat storage space 34 to the outside. Thus, the heating fluid supplied to the heat storage space 34 is not supplied to the electrolysis stack, which is separated from the heat storage space by the inner case 28. The air in the vacuum space 36 is discharged through the air lead-out pipe 42 to the outside. The fluid supply pipe 38, the fluid discharge pipe 40, and the air lead-out pipe 42 extend linearly.

One end of the fluid supply pipe 38 is airtightly joined to the first intermediate wall surface 30a. A fluid supply flow path 38a, which is an inner hole of the fluid supply pipe 38, and the heat storage space 34 communicate with each other. The one end of the fluid supply pipe 38 is positioned substantially at the center of the first intermediate wall surface 30a (see FIGS. 1 and 2). A fluid supply gate 44 (opening/closing portion) that opens and closes the fluid supply flow path 38a is attached to the other end of the fluid supply pipe 38.

One end of the fluid discharge pipe 40 is airtightly joined to the fourth intermediate wall surface 30d. The fluid discharge flow path 40a, which is an inner hole of the fluid discharge pipe 40, and the heat storage space 34 communicate with each other. One end of the fluid discharge pipe 40 is shifted from the center of the fourth intermediate wall surface 30d to the side opposite to the fluid supply flow path 38a (on the second intermediate wall surface 30b side) in the arrow X direction. The other end of the fluid discharge pipe 40 is airtightly joined to the fourth outer wall surface 32d. A fluid discharge gate 46 (opening/closing portion) that opens and closes the fluid discharge flow path 40a is attached to the other end of the fluid discharge pipe 40.

One end portion of the air lead-out pipe 42 is airtightly joined to the first outer wall surface 32a. The air lead-out flow path 43, which is an inner hole of the air lead-out pipe 42, and the vacuum space 36 communicate with each other. The air lead-out pipe 42 surrounds the fluid supply pipe 38. In other words, the fluid supply pipe 38 (fluid supply flow path 38a) is positioned inside the air lead-out flow path 43.

Specifically, the air lead-out flow path 43 is divided in the arrow Y direction by the fluid supply pipe 38. That is, the air lead-out flow path 43 includes a first air lead-out flow path 42a and a second air lead-out flow path 42b. The first air lead-out flow path 42a is positioned on the arrow Y1 side of the fluid supply pipe 38. The second air lead-out flow path 42b is positioned on the arrow Y2 side of the fluid supply pipe 38. A first vacuum gate 48a and a second vacuum gate 48b are attached to the other end of the air lead-out pipe 42. The first vacuum gate 48a opens and closes the first air lead-out flow path 42a. The second vacuum gate 48b opens and closes the second air lead-out flow path 42b.

The reaction fluid supply unit 16 includes a water tank 50, a water supply flow path 52, a water vapor generator 54, a water vapor lead-out flow path 56, a mixing unit 58, a first supply flow path 60, a supply connection pipe unit 62, and a second supply flow path 64. For example, water generated in external industrial facilities or the like is stored in the water tank 50. However, municipal water may be stored in the water tank 50. Water stored in the water tank 50 is introduced into the water vapor generator 54 through the water supply flow path 52. The water vapor generator 54 generates water vapor by heating the water guided from the water supply flow path 52. The water vapor generator 54 can heat the water by using the heating fluid discharged from the heat storage space 34 via the fluid discharge flow path 40a.

The water vapor lead-out flow path 56 introduces the water vapor generated by the water vapor generator 54 into the mixing unit 58. The mixing unit 58 mixes the water vapor as one reaction fluid and $CO_2$ gas as the other reaction fluid. As the $CO_2$ gas supplied to the mixing unit 58, for example, $CO_2$ gas generated in external industrial facilities or the like is used. The reaction fluid (water vapor and $CO_2$ gas) derived from the mixing unit 58 is supplied through the first supply flow path 60 to the supply connection flow path 62a which is an inner hole of the supply connection pipe unit 62.

The supply connection pipe unit 62 is provided in the case member 14. To be specific, one end portion of the supply connection pipe unit 62 is airtightly joined to the third inner wall surface 28c of the inner case 28. The other end portion of the supply connection pipe unit 62 is airtightly joined to the third outer wall surface 32c of the outer case 32. The supply connection pipe unit 62 penetrates the third intermediate wall surface 30c. An intermediate portion of the supply connection pipe unit 62 is airtightly joined to the third intermediate wall surface 30c of the intermediate case 30 so that the heat storage space 34 and the vacuum space 36 do not communicate with each other. The wall portion of the supply connection pipe unit 62 has a vacuum heat insulating space 63 so as to surround the supply connection flow path 62a. The heat insulating space 63 is a closed space. The reaction fluid led out from the supply connection flow path 62a is supplied into the electrolysis stack 12 through a second supply flow path 64. That is, the second supply flow path 64 is positioned inside the inner case 28.

The synthesis gas led-out unit 18 includes a first lead-out flow path 66, a lead-out connection pipe unit 68, and a second lead-out flow path 70. The first lead-out flow path 66 guides the synthesis gas discharged from the electrolysis stack 12 to a lead-out connection flow path 68a which is an inner hole of the lead-out connection pipe unit 68. The first lead-out flow path 66 is positioned inside the inner case 28.

The lead-out connection pipe unit 68 is provided to the case member 14. To be specific, one end of the lead-out connection pipe unit 68 is airtightly joined to the third inner wall surface 28c of the inner case 28. The other end of the lead-out connection pipe unit 68 is airtightly joined to the third outer wall surface 32c of the outer case 32. The lead-out connection pipe unit 68 penetrates the third intermediate wall surface 30c. An intermediate portion of the lead-out connection pipe unit 68 is airtightly joined to the third intermediate wall surface 30c so that the heat storage space 34 and the vacuum space 36 do not communicate with each other. The wall portion of the lead-out connection pipe unit 68 has a vacuum heat insulating space 71 so as to surround the lead-out connection flow path 68*a*. The heat insulating space 71 is a closed space. The second lead-out flow path 70 guides the synthesis gas led out from the lead-out connection flow path 68*a* to a methane production unit (not shown).

The vacuum generation unit 20 includes a first pump introduction flow path 72*a*, a first vacuum pump 74*a*, a first pump discharge flow path 76*a*, a first pressure vessel 78*a*, a second pump introduction flow path 72*b*, a second vacuum pump 74*b*, a second pump discharge flow path 76*b*, and a second pressure vessel 78*b*.

The first vacuum pump 74*a* discharges air in the vacuum space 36 via the first pump introduction flow path 72*a* and the first air lead-out flow path 42*a*. The air discharged through the first pump discharge flow path 76*a* by the first vacuum pump 74*a* is stored in the first pressure vessel 78*a* in a compressed state. The compressed air in the first pressure vessel 78*a* is used, for example, as a fluid for transferring the water stored in the water tank 50 to the water vapor generator 54.

The second vacuum pump 74*b* discharges air in the vacuum space 36 via the second pump introduction flow path 72*b* and the second air lead-out flow path 42*b*. The air discharged through the second pump discharge flow path 76*b* by the second vacuum pump 74*b* is stored in the second pressure vessel 78*b* in a compressed state. The compressed air in the second pressure vessel 78*b* is used, for example, as a fluid for transferring the water stored in the water tank 50 to the water vapor generator 54.

In the following description, the first vacuum pump 74*a* and the second vacuum pump 74*b* may be simply referred to as vacuum pumps 74. Further, the first pressure vessel 78*a* and the second pressure vessel 78*b* may be simply referred to as pressure vessels 78. In the vacuum generation unit 20, only one vacuum pump 74 may be provided. In the vacuum generating unit 20, only one pressure vessel 78 may be provided. In this case, the configuration of the vacuum generation unit 20 is simplified.

The temperature control unit 22 includes a first introduction flow path 80, a shut-off valve 81, a heater unit 82, a second introduction flow path 84, a cooling fluid supply unit 86, and a cooling fluid introduction flow path 88.

The first introduction flow path 80 guides the first heating fluid generated by the heating device 90 to the fluid supply flow path 38*a*. The heating device 90 is, for example, external industrial facilities such as an iron mill or a landfill. In other words, the first heating fluid is an exhaust heat fluid generated in the external industrial facilities or the like. Therefore, the temperature of the first heating fluid changes depending on the operating state of the external industrial facilities or the like. The shutoff valve 81 opens and closes the first introduction flow path 80.

The heater unit 82 blows the second heating fluid controlled to an appropriate temperature. That is, the heater unit 82 has a blowing function. The second introduction flow path 84 introduces the second heating fluid blown from the heater unit 82 to an intermediate portion of the first introduction flow path 80 (a downstream side of the shutoff valve 81 in the first introduction flow path 80). The cooling fluid supply unit 86 includes, for example, a blower that blows atmospheric air as the cooling fluid. However, the cooling fluid supply unit 86 may blow a fluid that has cooled the atmospheric area as the cooling fluid. The cooling fluid introduction flow path 88 introduces the cooling fluid blown from the cooling fluid supply unit 86 to an intermediate portion of the first introduction flow path 80 (a downstream side of the shutoff valve 81 in the first introduction flow path 80).

The control unit 24 includes a computation unit (processor) and a storage unit. The computation unit may be configured, for example, in the form of a processor (processing circuit) such as a CPU (Central Processing Unit). The computation unit includes an operation control unit that controls operations of the vacuum pump 74, the water vapor generator 54, the fluid supply gate 44, the fluid discharge gate 46, the first vacuum gate 48*a*, the second vacuum gate 48*b*, the shut-off valve 81, the heater unit 82, the cooling fluid supply unit 86, and the like. An operation control unit can be realized by programs stored in the storage unit being executed by the computation unit.

Next, a description will be given concerning a method of operating the electrolysis system 10.

Figure 3:
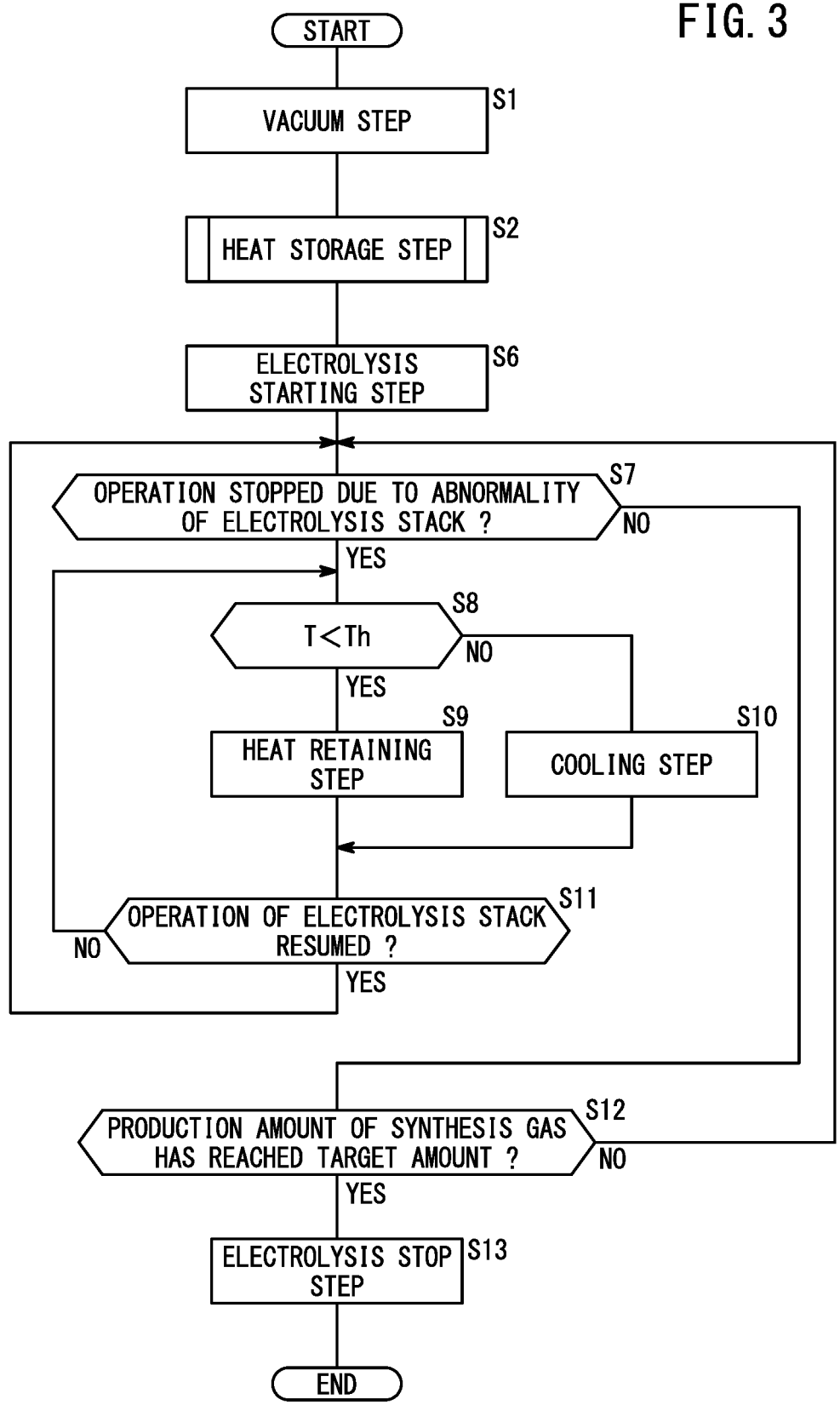
FIG. 3 is a flow chart illustrating a method of operating the electrolysis system of FIG. 1.

When the electrolysis system 10 is operated, first, as shown in FIG. 3, a vacuum step of removing air from the vacuum space 36 formed between the intermediate case 30 and the outer case 32 is performed (step S1). In detail, in the vacuum step, the control unit 24 opens the first vacuum gate 48*a* and the second vacuum gate 48*b*. Further, the control unit 24 drives the first vacuum pump 74*a* and the second vacuum pump 74*b*. As shown in FIG. 1, when the first vacuum pump 74*a* is driven, the air in the vacuum space 36 is led out through the first air lead-out flow path 42*a*, the first vacuum gate 48*a*, the first pump introduction flow path 72*a*, and the first pump discharge flow path 76*a*, and stored in the first pressure vessel 78*a* in a compressed state. When the second vacuum pump 74*b* is driven, the air in the vacuum space 36 is led out through the second air lead-out flow path 42*b*, the second vacuum gate 48*b*, the second pump introduction flow path 72*b*, and the second pump discharge flow path 76*b*, and stored in the second pressure vessel 78*b* in a compressed state.

Next, when the vacuum degree of the vacuum space 36 reaches the target vacuum degree, the control unit 24 closes the first vacuum gate 48*a* and the second vacuum gate 48*b*. In addition, the control unit 24 stops driving the first vacuum pump 74*a* and the second vacuum pump 74*b*. Thus, the vacuum step is completed.

Figure 4:
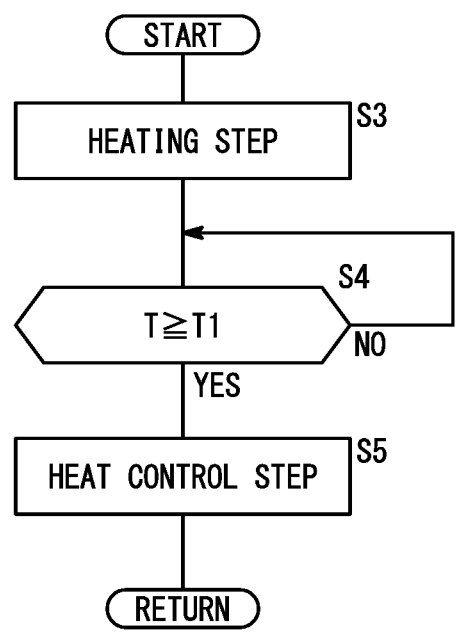
FIG. 4 is a flowchart for illustrating a heat storage step of FIG. 3.

Subsequently, a heat storage step of supplying the heating fluid to the heat storage space 34 formed between the inner case 28 and the intermediate case 30 is performed (step S2 in FIG. 3). In the heat storage step, first, a heating step is performed (step S3 in FIG. 4). Specifically, the control unit 24 opens the fluid supply gate 44, the fluid discharge gate 46, and the shutoff valve 81. In addition, the control unit 24 drives the heater unit 82. Then, a first heating fluid (exhaust heating fluid) is guided from the heating device 90 to the first introduction flow path 80. Further, a second heating fluid is guided from the heater unit 82 to the first introduction flow path 80 via the second introduction flow path 84. The heating fluid including the first heating fluid and the second heating fluid is supplied to the heat storage space 34 via the fluid supply gate 44 and the fluid supply flow path 38*a*. When the heating fluid is supplied to the heat storage space 34, the low-temperature air in the heat storage space 34 is pushed by the heating fluid and discharged to the outside via the fluid discharge flow path 40*a* and the fluid discharge gate 46. Thus, the heating fluid can be efficiently supplied to the heat storage space 34.

At this time, the heat quantity of the first heating fluid changes depending on the operating state of the heating device 90. Therefore, in the heating step, the heat quantity of the second heating fluid is changed in accordance with the change in the heat quantity of the first heating fluid so that the total heat quantity of the first heating fluid and the second heating fluid falls within the target heat quantity range. That is, when the heat quantity of the first heating fluid decreases, the control unit 24 controls the heater unit 82 so that the heat quantity of the second heating fluid increases. In addition, when the heat quantity of the first heating fluid increases, the control unit 24 controls the heater unit 82 such that the heat quantity of the second heating fluid decreases.

Thereafter, when the heat storage space 34 is filled with the heating fluid, the control unit 24 closes the fluid discharge gate 46. As a result, the pressure of the heating fluid supplied into the heat storage space 34 increases, and the temperature of the heat storage space 34 rises. Further, in the heat storage step, since the vacuum space 36 functions as a heat insulating layer, the heat of the heating fluid introduced into the heat storage space 34 can be prevented from dissipating to the outside through the vacuum space 36. Therefore, the temperature of the heat storage space 34 can be efficiently increased.

Subsequently, the control unit 24 determines whether or not the temperature T in the heat storage space 34 has reached a predetermined temperature T1 (step S4). Here, the predetermined temperature T1 is set to a temperature slightly lower than the target temperature of the heat storage space 34. When the temperature T in the heat storage space 34 is lower than the predetermined temperature T1 (step S4: NO), the process of step S4 is performed again. When the temperature T in the heat storage space 34 has reached the predetermined temperature T1 (step S4: YES), the temperature control step is performed (step S5).

In the temperature control step, the control unit 24 closes the shutoff valve 81 to shut off the supply of the first heating fluid to the heat storage space 34. That is, only the second heating fluid introduced into the first introduction flow path 80 from the heater unit 82 via the second introduction flow path 84 is supplied to the heat storage space 34. Accordingly, precise adjustment of the temperature T in the heat storage space 34 can be easily performed. When the temperature T in the heat storage space 34 reaches the target temperature, the heat storage step is terminated.

Thereafter, as shown in FIG. 3, an electrolysis starting step is performed (step S6). That is, the control unit 24 guides the compressed air of at least one of the first pressure vessel 78a and the second pressure vessel 78b to the water tank 50. Further, the control unit 24 drives the water vapor generator 54 and controls an electrolysis power supply (not shown) to apply voltage to the electrolysis stack 12.

Then, the water stored in the water tank 50 is pushed by the compressed air and guided to the water vapor generator 54 via the water supply flow path 52. The water vapor generator 54 generates water vapor by heating the water guided from the water supply flow path 52. The water vapor generated by the water vapor generator 54 is guided to the mixing unit 58 via the water vapor lead-out flow path 56. In the mixing unit 58, the water vapor guided from the water vapor lead-out flow path 56 and $CO_2$ gas supplied from external industrial facilities or the like are mixed. The reaction fluids (water vapor and $CO_2$ gas) mixed in the mixing unit 58 are supplied to the electrolysis stack 12 via the first supply flow path 60, the supply connection flow path 62a, and the second supply flow path 64.

The reaction fluids supplied to the electrolysis stack 12 is supplied to the cathode of each electrolysis cell 26 and electrolyzed (co-electrolyzed). In other words, water vapor is electrolyzed to generate hydrogen gas, and $CO_2$ gas is electrolyzed to generate CO gas (carbon monoxide gas). The synthesis gas containing the hydrogen gas and the carbon monoxide gas is supplied from the electrolysis stack 12 to a methane production unit (not shown) via the first lead-out flow path 66, the lead-out connection flow path 68a and the second lead-out flow path 70. At this time, the electrolysis stack 12 generates heat as a voltage is applied thereto, and is kept at an appropriate temperature because it is surrounded by the heat storage space 34 and the vacuum space 36.

After the electrolysis start step is performed, the control unit 24 determines whether or not there was an operation stop due to an abnormality of the electrolysis stack 12 (step S7). When there is an operation stop due to an abnormality of the electrolysis stack 12 (step S7: YES), the control unit 24 determines whether or not the temperature T in the heat storage space 34 is lower than the upper limit temperature Th (step S8).

When the temperature T in the heat storage space 34 is lower than the upper limit temperature Th (step S8: YES), the heat retaining step (hot standby mode) is performed (step S9). Specifically, the control unit 24 opens the fluid supply gate 44 to supply at least one of the first heating fluid and the second heating fluid to the heat storage space 34, thereby maintaining the temperature T in the heat storage space 34 within a predetermined temperature range. As a result, it is possible to suppress an excessive decrease in the temperature of the electrolysis stack 12, and thus it is possible to shorten the time required for resuming the operation.

On the other hand, when the temperature T in the heat storage space 34 is equal to or higher than the upper limit temperature Th (step S8: NO), the cooling step is performed (step S10). Specifically, the control unit 24 opens the fluid supply gate 44 and the fluid discharge gate 46, and introduces the cooling fluid from the cooling fluid supply unit 86 to the first introduction flow path 80 via the cooling fluid introduction flow path 88, thereby supplying the cooling fluid to the heat storage space 34. As a result, an excessive increase in the temperature of the electrolysis stack 12 can be suppressed. At this time, the heating fluid discharged from the fluid discharge flow path 40a is guided to the water vapor generator 54 and used as a heat source for heating water.

Thereafter, the control unit 24 determines whether or not the operation of the electrolysis stack 12 has been resumed (step S11). If the operation of the electrolysis stack 12 has not been resumed (step S11: NO), the process returns to step S8. When the operation of the electrolysis stack 12 has been resumed (step S11: YES), the process returns to step S7.

In a case where there is no operation stoppage due to an abnormality of the electrolysis stack 12 (step S7: NO), the control unit 24 determines whether or not the production amount of the synthesis gas has reached the target amount (step S12). If the production amount of the synthesis gas has not reached the target amount (step S12: NO), the process returns to step S7.

When the production amount of the synthesis gas has reached the target amount (step S12: YES), an electrolysis stop step is performed (step S13). That is, the control unit 24 stops the application of voltage to the electrolysis stack 12 by the electrolysis power supply (not shown) and stops the supply of the reaction gas to the electrolysis stack 12. Thus, a series of operation flows of the method of operating the electrolysis system 10 ends.

The present embodiment exhibits the following advantageous effects.

According to the present embodiment, the degree of vacuum in the vacuum space 36 can be controlled by discharging the air in the vacuum space 36 to the outside from the air lead-out flow path 43. Further, the temperature T in the heat storage space 34 can be controlled by supplying the heating fluid from the fluid supply flow path 38a to the heat storage space 34. Thus, the temperature of the electrolysis stack 12 can be easily controlled.

The fluid supply flow path 38a is positioned inside the air lead-out flow path 43.

According to such a configuration, a decrease in the temperature of the heating fluid flowing through the fluid supply flow path 38a can be suppressed by the air lead-out flow path 43.

The intermediate case 30 is provided with the fluid discharge flow path 40a for discharging the fluid in the heat storage space 34.

According to such a configuration, the temperature T in the heat storage space 34 can be efficiently controlled.

The electrolysis system 10 includes the first introduction flow path 80 and the second introduction flow path 84. The first introduction flow path 80 guides the first heating fluid generated by the heating device 90, as the heating fluid, to the fluid supply flow path 38a. The second heating fluid is supplied as a heating fluid through the second introduction flow path 84 to the first introduction flow path 80.

According to such a configuration, even when the heat quantity of the first heating fluid changes, the total heat quantity of the first heating fluid and the second heating fluid can be maintained within a predetermined range by changing the heat quantity of the second heating fluid.

The electrolysis system 10 includes the cooling fluid introduction flow path 88 for supplying the cooling fluid to the heat storage space 34.

According to such a configuration, it is possible to suppress an excessive increase in the temperature of the electrolysis stack 12 by supplying the cooling fluid to the heat storage space 34.

The electrolysis system 10 includes the pressure vessel 78 in which the air discharged through the air lead-out flow path 43 is stored in a compressed state. The compressed air stored in the pressure vessel 78 is used as a fluid for transferring another fluid (for example, water) necessary for operating the electrolysis stack 12.

According to this configuration, the compressed air generated when the vacuum space 36 is evacuated can be effectively used.

In the method of operating the electrolysis system 10, the heat storage step is started after the vacuum step is ended.

According to this method, it is possible to prevent the heat of the heating fluid supplied to the heat storage space 34 from dissipating to the outside through the vacuum space 36 during the heat storage step.

The heat storage step includes the heating step of supplying both the first heating fluid generated by the heating device 90 and the second heating fluid for controlling the temperature T in the heat storage space 34, to the heat storage space 34.

According to such a method, the temperature of the heat storage space 34 can be efficiently increased by the first heating fluid and the second heating fluid.

The heat storage step includes a temperature control step. In the temperature control step, when the temperature T in the heat storage space 34 reaches a predetermined temperature T1 by the heating step, the supply of the first heating fluid to the heat storage space 34 is interrupted, and only the second heating fluid is supplied to the heat storage space 34.

According to such a method, the temperature in the heat storage space 34 can be precisely adjusted by the second heating fluid.

The method of operating the electrolysis stack 12 includes a heat retaining step. In the heat retaining step, in a case where the operation of the electrolysis stack 12 is stopped due to an abnormality after the electrolysis starting step, and the temperature T in the heat storage space 34 is lower than the upper limit temperature Th, at least one of the first heating fluid and the second heating fluid is supplied to the heat storage space 34.

According to such a method, it is possible to suppress an excessive decrease in the temperature of the electrolysis stack 12 when the operation of the electrolysis stack 12 is stopped due to an abnormality, and thus it is possible to reduce the time required for resuming the operation.

The method of operating the electrolysis stack 12 includes a cooling step. In the cooling step, in the case where the electrolysis stack 12 is stopped due to an abnormality after the electrolysis starting step, and the temperature T of the heat storage space 34 is equal to or higher than the upper limit temperature Th, the cooling fluid is supplied to the heat storage space 34.

According to such a method, it is possible to suppress an excessive increase in the temperature of the electrolysis stack 12 when the operation of the electrolysis stack 12 is stopped due to an abnormality.

The present invention is not limited to the embodiment described above, and it goes without saying that various modified or additional configurations could be adopted therein without departing from the essence and gist of the present invention.

The embodiment described above can be summarized in the following manner.

The above embodiment discloses the electrolysis system (10) including an electrolysis stack (12) in which a plurality of solid oxide electrolysis cells (26) are stacked one another, the electrolysis system including an inner case (28) that houses the electrolysis stack, the intermediate case (30) that encloses the inner case from outside, and an outer case (32) that encloses the intermediate case from outside, wherein the heat storage space (34) is formed between the inner case and the intermediate case, the vacuum space (36) is formed between the intermediate case and the outer case, the intermediate case includes the fluid supply flow path (38a) for supplying the heating fluid to the heat storage space, and the outer case includes the air outlet flow path (43) for discharging air in the vacuum space to the outside.

In the electrolysis system, the fluid supply flow path may be positioned inside the air lead-out flow path.

In the electrolysis system, the intermediate case may be provided with the fluid discharge flow path (40a) for discharging the fluid in the heat storage space.

The electrolysis system described above may include the first introduction flow path (80) for introducing the first heating fluid generated by the heating device (90) into the fluid supply flow path as the heating fluid, and the second introduction flow path (84) for supplying the second heating fluid as the heating fluid to the first introduction flow path.

In the electrolysis system described above, the cooling fluid introduction flow path (88) for supplying the cooling fluid to the heat storage space may be provided.

In the electrolysis system described above may further include the pressure vessel (78) in which the air discharged through the air discharge flow path is stored in a compressed state, and the compressed air stored in the pressure vessel may be used for transferring the fluid required for operating the electrolysis stack.

The above embodiment discloses a method of operating an electrolysis system including an electrolysis stack in which a plurality of solid oxide electrolysis cells are stacked one another, wherein the electrolysis system includes an inner case that houses the electrolysis stack, an intermediate case that encloses the inner case from outside, and an outer case that encloses the intermediate case from outside, the method including: a vacuuming step of discharging air in a vacuum space formed between the intermediate case and the outer case; a heat storage step of supplying a heating fluid to a heat storage space formed between the inner case and the intermediate case; and an electrolysis starting step of starting electrolysis by the electrolysis stack after the vacuum step and the heat storage step.

In the above method of operating the electrolysis system, the heat storage step may be started after the vacuum step is ended.

In the method of operating the electrolysis system described above, the heat storage step may include the heating step of supplying, to the heat storage space, both the first heating fluid generated by the heating device and the second heating fluid for controlling the temperature (T) in the heat storage space.

The heat storage step may include the temperature control step of interrupting the supply of the first heating fluid to the heat storage space and supplying only the second heating fluid to the heat storage space when the temperature of the heat storage space has reached the predetermined temperature (T1) in the heating step.

The above method of operating the electrolysis system may further include the heat retaining step of supplying the heating fluid to the heat storage space in the case where the operation of the electrolysis stack is stopped due to an abnormality after the electrolysis starting step, and the temperature in the heat storage space is lower than the upper limit temperature (Th).

The method of operating the electrolysis system described above may further include the cooling step of supplying the cooling fluid to the heat storage space in the case where the electrolysis stack is stopped due to an abnormality after the electrolysis starting step, and the temperature in the heat storage space is equal to or higher than the upper limit temperature.

In the operating method of the electrolysis system, the air discharged from the vacuum space during the vacuum step may be stored in the pressure vessel in the compressed state, and the compressed air stored in the pressure vessel may be used for transferring the fluid required for operating the electrolysis system.

What is claimed is:

1. An electrolysis system comprising an electrolysis stack in which a plurality of solid oxide electrolysis cells are stacked one another, further comprising:
    an inner case that houses the electrolysis stack; an intermediate case that encloses the inner case from outside; and an outer case that encloses the intermediate case from outside, wherein
    a heat storage space is formed between the inner case and the intermediate case,
    a vacuum space is formed between the intermediate case and the outer case,
    the intermediate case is provided with a fluid supply flow path through which a heating fluid is supplied to the heat storage space,
    the outer case is provided with an air lead-out flow path for discharging air in the vacuum space to an outside,
    the heating fluid supplied to the heat storage space is not supplied to the electrolysis stack, and
    the heat storage space surrounds an entirety of the inner case from outside.

2. The electrolysis system according to claim 1, wherein the fluid supply flow path is positioned inside the air lead-out flow path.

3. The electrolysis system according to claim 1, wherein the intermediate case is provided with a fluid discharge flow path for discharging a fluid in the heat storage space.

4. The electrolysis system according to claim 1, further comprising:
    a first introduction flow path through which a first heating fluid generated by a heating device is introduced, as the heating fluid, into the fluid supply flow path; and
    a second introduction flow path through which a second heating fluid is supplied, as the heating fluid, to the first introduction flow path.

5. The electrolysis system according to claim 1, further comprising a cooling fluid introduction flow path through which a cooling fluid is supplied to the heat storage space.

6. The electrolysis system according to claim 1, further comprising:
    a pressure vessel in which the air discharged through the air lead-out flow path is stored in a compressed state,
    wherein the air stored in the compressed state in the pressure vessel is used for transferring a fluid required for operating the electrolysis stack.

7. A method for operating an electrolysis system including an electrolysis stack in which a plurality of solid oxide electrolysis cells are stacked one another,
    wherein the electrolysis system further includes an inner case that houses the electrolysis stack, an intermediate case that encloses the inner case from outside, and an outer case that encloses the intermediate case from outside,
    the method of operating the electrolysis system comprising:
    a vacuum step of discharging air in a vacuum space formed between the intermediate case and the outer case;
    a heat storage step of supplying a heating fluid to a heat storage space formed between the inner case and the intermediate case; and
    an electrolysis starting step of starting electrolysis by the electrolysis stack after the vacuum step and the heat storage step, wherein
    the heating fluid supplied to the heat storage space is not supplied to the electrolysis stack, and
    the heat storage space surrounds an entirety of the inner case from outside.

8. The method of operating the electrolysis system according to claim 7, wherein the heat storage step is started after the vacuum step is ended.

9. The method of operating the electrolysis system according to claim 7, wherein the heat storage step comprises a heating step of supplying to the heat storage space both a first heating fluid generated by a heating device and a second heating fluid for controlling a temperature in the heat storage space.

10. The method of operating the electrolysis system according to claim 9,
    wherein the heat storage step includes a temperature control step of interrupting supply of the first heating fluid to the heat storage space and supplying only the second heating fluid to the heat storage space in a case where the temperature of the heat storage space has reached a predetermined temperature in the heating step.

11. The method of operating the electrolysis system according to claim 7, further comprising:
a heat retaining step of supplying the heating fluid to the heat storage space in a case where the operation of the electrolysis stack is stopped due to an abnormality after the electrolysis start step and a temperature in the heat storage space is lower than an upper limit temperature.

12. The method of operating the electrolysis system according to claim 7, further comprising:
a cooling step of supplying a cooling fluid to the heat storage space in a case where the electrolysis stack is stopped due to an abnormality after the electrolysis starting step and a temperature in the heat storage space is equal to or higher than an upper limit temperature.

13. The method of operating the electrolysis system according to claim 7,
wherein the air discharged from the vacuum space during the vacuum step is stored in a compressed state in a pressure vessel, and
the air stored in the compressed state in the pressure vessel is used for transferring a fluid required for operating the electrolysis system.

14. The electrolysis system according to claim 1, wherein the inner case houses an entirety of the electrolysis stack.

15. The method of operating the electrolysis system according to claim 7, wherein the inner case houses an entirety of the electrolysis stack.

* * * * *